United States Patent
Runzo et al.

(10) Patent No.: US 12,169,684 B2
(45) Date of Patent: Dec. 17, 2024

(54) SYSTEM AND METHOD FOR PROVIDING ACCESSIBILITY OF FILES OVER A COMMUNICATIONS NETWORK

(71) Applicant: Equisolve, Inc., Palm City, FL (US)

(72) Inventors: Thomas Runzo, Palm City, FL (US); Eric Mason, Palm City, FL (US)

(73) Assignee: Equisolve, Inc., Palm City, FL (US)

( * ) Notice: Subject to any disclaimer, the term of this patent is extended or adjusted under 35 U.S.C. 154(b) by 42 days.

(21) Appl. No.: 18/068,483

(22) Filed: Dec. 19, 2022

(65) Prior Publication Data

US 2023/0267268 A1    Aug. 24, 2023

Related U.S. Application Data

(63) Continuation-in-part of application No. 17/685,693, filed on Mar. 3, 2022, which is a continuation-in-part of application No. 17/675,735, filed on Feb. 18, 2022.

(51) Int. Cl.

| | |
|---|---|
| G06F 17/00 | (2019.01) |
| G06F 16/81 | (2019.01) |
| G06F 16/955 | (2019.01) |
| G06F 40/134 | (2020.01) |
| H04L 67/06 | (2022.01) |

(52) U.S. Cl.
CPC ............ *G06F 40/134* (2020.01); *G06F 16/81* (2019.01); *G06F 16/9558* (2019.01); *G06F 16/9566* (2019.01); *H04L 67/06* (2013.01)

(58) Field of Classification Search
CPC .... G06F 40/134; G06F 16/81; G06F 16/9558; G06F 16/9566; G06F 16/972; H04L 67/06
See application file for complete search history.

(56) References Cited

U.S. PATENT DOCUMENTS

| | | | | |
|---|---|---|---|---|
| 7,380,120 | B1 * | 5/2008 | Garcia | H04L 63/20 713/168 |
| 8,108,827 | B2 * | 1/2012 | Chen | G06F 40/166 717/110 |
| 8,601,367 | B1 * | 12/2013 | Ritz | G06Q 40/00 715/234 |
| 9,734,160 | B1 * | 8/2017 | Huntwork | G06F 16/188 |

(Continued)

FOREIGN PATENT DOCUMENTS

| | | | | |
|---|---|---|---|---|
| WO | WO-2005111844 A1 * | 11/2005 | | F21V 17/18 |
| WO | WO-2006020801 A2 * | 2/2006 | | G06Q 10/10 |
| WO | WO-2018185692 A1 * | 10/2018 | | G06F 16/2365 |

*Primary Examiner* — Laurie A Ries
(74) *Attorney, Agent, or Firm* — Mark Terry

(57) ABSTRACT

A system and method for facilitating the provision of accessible files over a communications network includes a web server for polling an entity to determine whether a files for a particular company have been published, downloading said plurality files, identifying inaccessible XML-based files, and remediating them using a predefined accessible template, thereby generating accessible files, identifying a non-XML-based inaccessible files and remediating them using a rules engine, thereby generating accessible files, and generating and publishing a web page that is publicly available over the communications network, wherein the web page includes a separate link to each particular file of the accessible files, wherein said web page is located on a web site of the particular company.

20 Claims, 6 Drawing Sheets

(56) References Cited

U.S. PATENT DOCUMENTS

| | | | |
|---|---|---|---|
| 10,114,609 B2* | 10/2018 | Annett | G06F 3/167 |
| 11,468,126 B2* | 10/2022 | Zhang | G06F 16/9535 |
| 11,838,287 B2* | 12/2023 | Dasgupta | H04L 63/0892 |
| 11,949,815 B1* | 4/2024 | Liu | H04L 65/1046 |
| 2002/0155419 A1* | 10/2002 | Banerjee | G09B 7/00 434/322 |
| 2005/0114381 A1* | 5/2005 | Borthakur | G06F 16/10 707/999.102 |
| 2007/0055938 A1* | 3/2007 | Herring | G09B 21/00 715/729 |
| 2007/0244775 A1* | 10/2007 | Linder | G06Q 40/00 705/35 |
| 2007/0277088 A1* | 11/2007 | Bodin | G06F 16/957 707/E17.119 |
| 2008/0301171 A1* | 12/2008 | Owen, Jr. | G06F 16/972 707/999.102 |
| 2010/0162100 A1* | 6/2010 | Portilla | G06F 16/986 715/236 |
| 2011/0153555 A1* | 6/2011 | Falkenberg | G06Q 10/10 707/E17.005 |
| 2012/0179840 A1* | 7/2012 | Belanger | H04L 67/10 709/246 |
| 2013/0212469 A1* | 8/2013 | Tian | G06F 40/154 715/236 |
| 2013/0246343 A1* | 9/2013 | Victor | G06F 16/176 707/E17.005 |
| 2015/0163206 A1* | 6/2015 | McCarthy | G06F 21/6227 726/4 |
| 2016/0306984 A1* | 10/2016 | Amarendran | G06N 5/02 |
| 2017/0041296 A1* | 2/2017 | Ford | G06F 21/64 |
| 2019/0050445 A1* | 2/2019 | Griffith | G06F 16/27 |
| 2020/0052921 A1* | 2/2020 | van Rensburg | H04L 12/1818 |
| 2022/0366003 A1* | 11/2022 | Ekron | G06F 16/9535 |

* cited by examiner

SYSTEM AND METHOD FOR PROVIDING ACCESSIBILITY OF FILES OVER A COMMUNICATIONS NETWORK

CROSS-REFERENCE TO RELATED APPLICATIONS

This patent application is a continuation in part of, and claims priority to, patent application Ser. No. 17/685,693 filed Mar. 3, 2022, and titled "system and method for providing accessibility of financial documents" which is a continuation in part of, and claims priority to, patent application Ser. No. 17/675,735 filed Feb. 18, 2022, and titled "system and method for managing material non-public information for financial industry." The subject matter of patent application Ser. Nos. 17/685,693 and 17/675,735 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of accessibility technology and, more specifically, the claimed subject matter relates to the field of providing files that are accessible to the disabled or those using assistive technology.

BACKGROUND

The Securities and Exchange Commission (SEC) requires public companies, certain company insiders, and broker-dealers to file periodic financial statements and other disclosures, which are often referred to as SEC filings, SEC filing documents, or regulatory files. Finance professionals and investors rely on SEC filings to make informed decisions when evaluating whether to invest in a company. SEC filings can be accessed for free on the SEC's website and the company's website, referred to as its Electronic Data Gathering, Analysis, and Retrieval system, otherwise known as EDGAR. The SEC selectively reviews the information it receives to monitor and enhance compliance. Investors study SEC filings to form a view of a company's performance and activities. Similarly, newswires and news aggregators are organizations that gather news reports and press releases and distributes them. Investors also study press releases to form a view of a company's performance and activities.

For the majority of consumers and investors, maneuvering through EDGAR and reading SEC filings and press releases is a relatively easy task. But for the 3 out of every 100 individuals that due to low vision, blindness, physical and cognitive disabilities, need to use screen readers and assistive technology, tasks like these can be problematic. One solution to this problem is the provision of accessible files. An accessible file is created to be as easily readable by a sighted reader as a low vision, non-sighted reader, or those who require assistive technology. Making files accessible allows individuals with low vision, blindness and disabilities to maneuver through, read and understand documents, and therefore have equal access to information that others take for granted.

One of the drawbacks associated with EDGAR and news-wires or news aggregators, however, is that they do not do an adequate job of providing accessible files. This is disadvantageous to the disabled or those using assistive technology as it does not provide them with equal access to the same information that is accessible to those without disabilities. The lack of accessible files in the financial, regulatory of communications sector further disenfranchises a large segment of the population from participating in investment activities, which has long-ranging implications.

Therefore, what is needed is a system and method for improving the problems with the prior art, and more particularly for a more expedient and efficient method and system for facilitating the provision of accessible files to the disabled or those using assistive technology.

BRIEF SUMMARY

In one embodiment, a system for facilitating the provision of accessible files over a communications network is disclosed. The system includes a web server communicably connected to the communications network, the web server configured for polling an entity over the communications network to determine whether a plurality of files associated with a particular company have been published by the entity, detecting that the entity has published said plurality of files, downloading said plurality of files from the entity over the communications network, identifying a first set of inaccessible XML-based files of the plurality of files, and remediating said first set of inaccessible XML-based files using a predefined accessible template, thereby generating and storing a first plurality of accessible files based on the first set of inaccessible XML-based files, identifying a second set of non-XML-based inaccessible files of the plurality of files, remediating said second set of non-XML-based inaccessible files using a rules engine, thereby generating and storing a second plurality of accessible files based on the second set of non-XML-based inaccessible files, and generating and publishing a web page that is publicly available over the communications network, wherein the web page includes a separate link to each particular file of the first and second plurality of accessible files, wherein said web page is located on a web site of the particular company.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1:
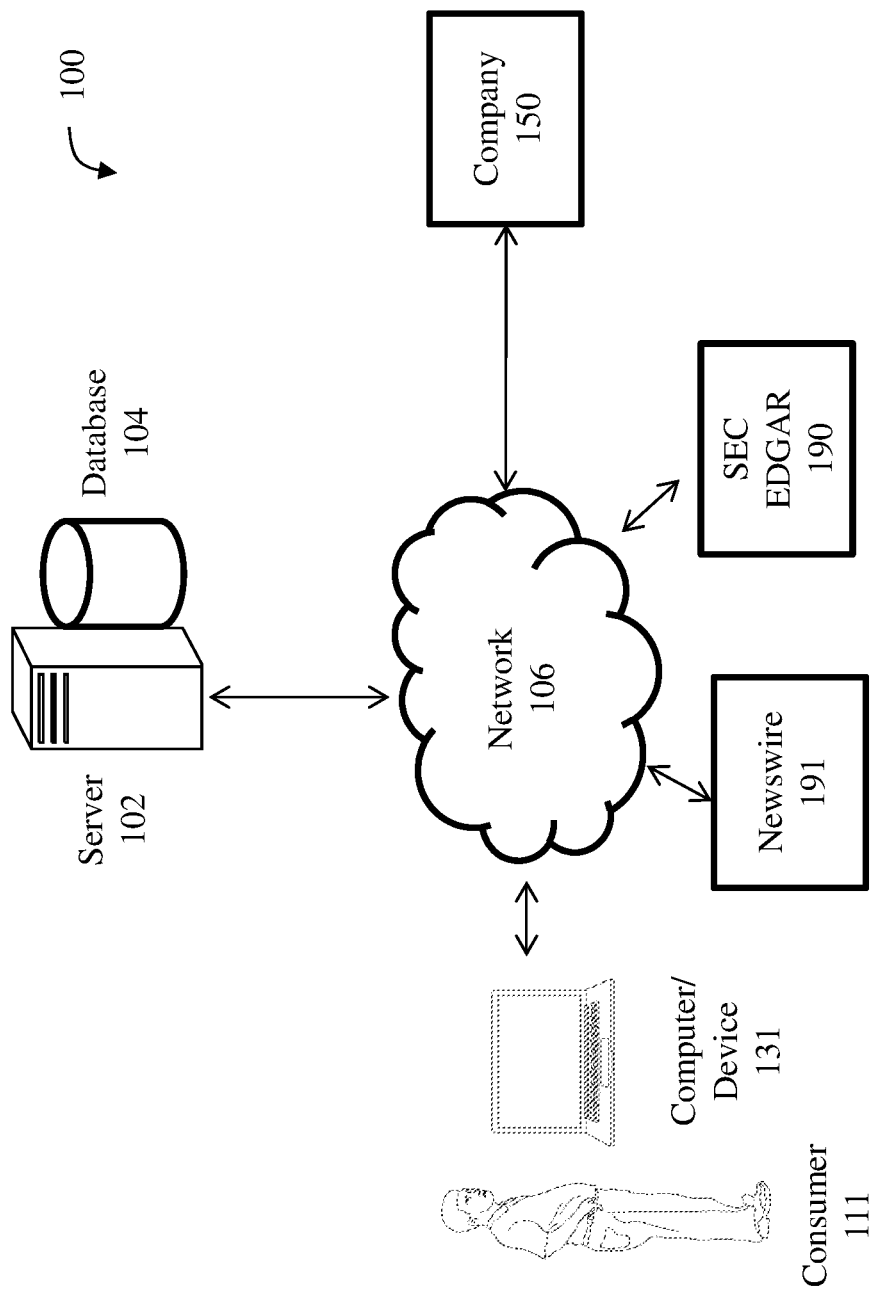
FIG. 1 is a block diagram illustrating the network architecture of a system for facilitating the provision of accessible files over a communications network, in accordance with one embodiment.

While the claimed embodiments may be described, modifications, adaptations, and other implementations are possible. For example, substitutions, additions, or modifications may be made to the elements illustrated in the drawings, and the compositions and methods described herein may be modified by substituting, reordering, or adding elements to the disclosed compositions or stages to the disclosed methods. Accordingly, the following detailed description does not limit the claimed embodiments. Instead, the proper scope of the claimed embodiments is defined by the appended claims.

The claimed embodiment improve over the prior art by providing an automated process for remediating files of all types while providing the simultaneous distribution of financial information (among other types of information) to the general public, including the disabled or those using assistive technology. The claimed embodiments are configured for the automatic detection of inaccessible files or inaccessible portions of files, and the automatic generation of accessible files that correspond to said inaccessible files or inaccessible portions of files. Therefore, the disclosed embodiments reduce or eliminate instances where disabled users or those using assistive technology are not able to view important financial, regulatory, and/or communication files and/or code necessary to make financial decisions. This is advantageous for disabled users or those using assistive technology, as it provides greater access to trading markets and financial activities. An additional benefit of the disclosed embodiments is the automatic and immediate publication of accessible files at the same time as the Securities and Exchange Commission (SEC) filing or a press release is made public, which reduces the need for human interaction in the publication process. The main benefit of the claimed subject matter is the improvement of the conventional process of publishing financial information, to the advantage of the disabled or those using assistive technology. The claimed subject matter further allows for the automation of the process of producing accessible versions of inaccessible files, thereby resulting in a time savings.

Referring now to the drawing figures in which like reference designators refer to like elements, there is shown in FIG. 1 an illustration of a block diagram showing the network architecture of a system 100 and method for facilitating the provision of accessible financial, regulatory, and/or communication files and/or code over a communications network in accordance with one embodiment. A prominent element of FIG. 1 is the server 102 associated with repository or database 104 and further communicatively coupled with network 106, which can be a circuit-switched network, such as the Public Service Telephone Network (PSTN), or a packet-switched network, such as the Internet or the World Wide Web, the global telephone network, a cellular network, a mobile communications network, or any combination of the above. Server 102 is a central controller or operator for the functionality of the disclosed embodiments, namely, facilitating the provision of accessible files between users.

FIG. 1 includes computing devices 131, 150, 190, 191 which may be mobile computing devices such as smartphones, mobile phones, tablet computers, handheld computers, laptops, or the like. In another embodiment, computing devices 131, 150, 190, 191 may be stationary devices such as workstations, desktop computers, servers, laptops, all-in-one computers, or the like. In another embodiment, computing devices 131, 150, 190, 191 are AR or VR systems that may include display screens, headsets, heads-up displays, helmet-mounted display screens, or the like. Computing device 131 corresponds to a consumer 111 of financial, regulatory, and/or communication files and/or code. Computing device 190 corresponds to the Securities and Exchange Commission's (SEC's) free online database, referred to as its Electronic Data Gathering, Analysis, and Retrieval system, otherwise known as EDGAR. Device 190 may also be a site, a collection of servers, or the like. Computing device 191 corresponds to a newswire or news aggregator. Device 191 may also be a site, a collection of servers, or the like. Computing device 150 corresponds to a publicly traded company or any company that is subject to financial regulations that require simultaneous disclosure. Device 150 may also be a site, a collection of servers or the like. Devices 131, 150, 190, 191 may be communicatively coupled with network 106 in a wired or wireless fashion.

FIG. 1 further shows that server 102 includes a database or repository 104, which may be a relational database comprising a database stored in a server. Devices 131, 150, 190, 191 may also each include their own database. The repository 104 serves data from a database, which is a repository for data used by server 102 and devices 131, 150, 190, 191 during the course of operation of the disclosed embodiments. Database 104 may be distributed over one or more nodes or locations that are connected via network 106.

Database 104 may include a user record for each user 111. A user record may include: contact/identifying information for the user (name, address, telephone number(s), email address, etc.), information pertaining to files associated with the user, information pertaining to the files viewed by the user etc. A user record may also include a unique identifier for each user, and the current location of each user (based on location-based services from the user's computing device).

The database 104 may include a company record for each company 150. A company record may include: contact/identifying information for the company (name, address, telephone number(s), email address, website etc.), the company ticker symbol, information pertaining to files associated with the company, etc. A company record may also include a unique identifier for each company and a description of past files issued by said company.

Database 104 may include a record for each file. A file comprises a collection of data that is stored in electronic form in a particular format on a storage device, primarily identified by its filename. In one embodiment, database 104 is used to hold SEC filing documents or files, among other types of files. Examples of documents or files referred to as SEC filings are a registration statement, form 10-K, form 10-Q, form 8-K, proxy statement, forms 3, 4, and 5, schedule 13D, form 144, and foreign investment disclosures.

A registration statement provides information about the securities being offered by a company as well as its financial condition. A Form 10-K is an annual report that provides a comprehensive analysis of the company's financial condition. A Form 10-Q is a truncated version of a Form 10-K that is filed quarterly. The form provides a view of the company's ongoing financial condition throughout the year. A Form 8-K is what a company uses to disclose major developments that occur between filings of the Form 10-K or form 10-Q. Major company events that would necessitate the filing of a Form 8-K include bankruptcies or receiverships, material impairments, completion of acquisition or disposition of assets, or departures or appointments of executives. A proxy statement discloses the salaries of the management of a company and any other perks that a company's management is eligible for. The proxy statement is presented prior to the shareholder meeting and must be filed with the SEC before soliciting a shareholder vote on the election of directors and approval of other corporate actions. Forms 3, 4, and 5 disclose ownership amounts of company directors and officers, changes in ownership, and an annual summary. Schedule 13D is a beneficial ownership report and is required when any owner acquires 5% or more of the voting shares in a company. Form 144 is required when corporate insiders want to dispose of company stock. Form 144 is a notice of the intent to sell restricted stock, typically acquired by insiders or affiliates in a transaction not involving a public offering. Foreign investment disclosures apply to foreign companies offering securities in the U.S. market.

Note that although this document describes SEC filing document and other financial documents or files, the claimed embodiments support the same processes for any financial, regulatory or communications documents or files. FIG. 1 shows an embodiment wherein networked computing devices 131, 150, 190, 191 interact with server 102 and repository 104 over the network 106. It should be noted that although FIG. 1 shows only the networked computers 131, 150, 190, 191, the system of the disclosed embodiments supports any number of networked computing devices connected via network 106. Further, server 102 and units 131, 150, 190, 191 include program logic such as computer programs, mobile applications, executable files or computer instructions (including computer source code, scripting language code, or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 150, 190, 191. Further, server 102 and its functionality, according to a preferred embodiment, can be realized in a centralized fashion in one computer system or in a distributed fashion wherein different elements are spread across several interconnected computer systems. Note also that although this document describes EDGAR 190 as the entity to which files are uploaded and from which files are downloaded, in one embodiment, said files may be uploaded to, or downloaded from, any entity, including any regulatory agency, any newswire or any information aggregator.

Figure 2:
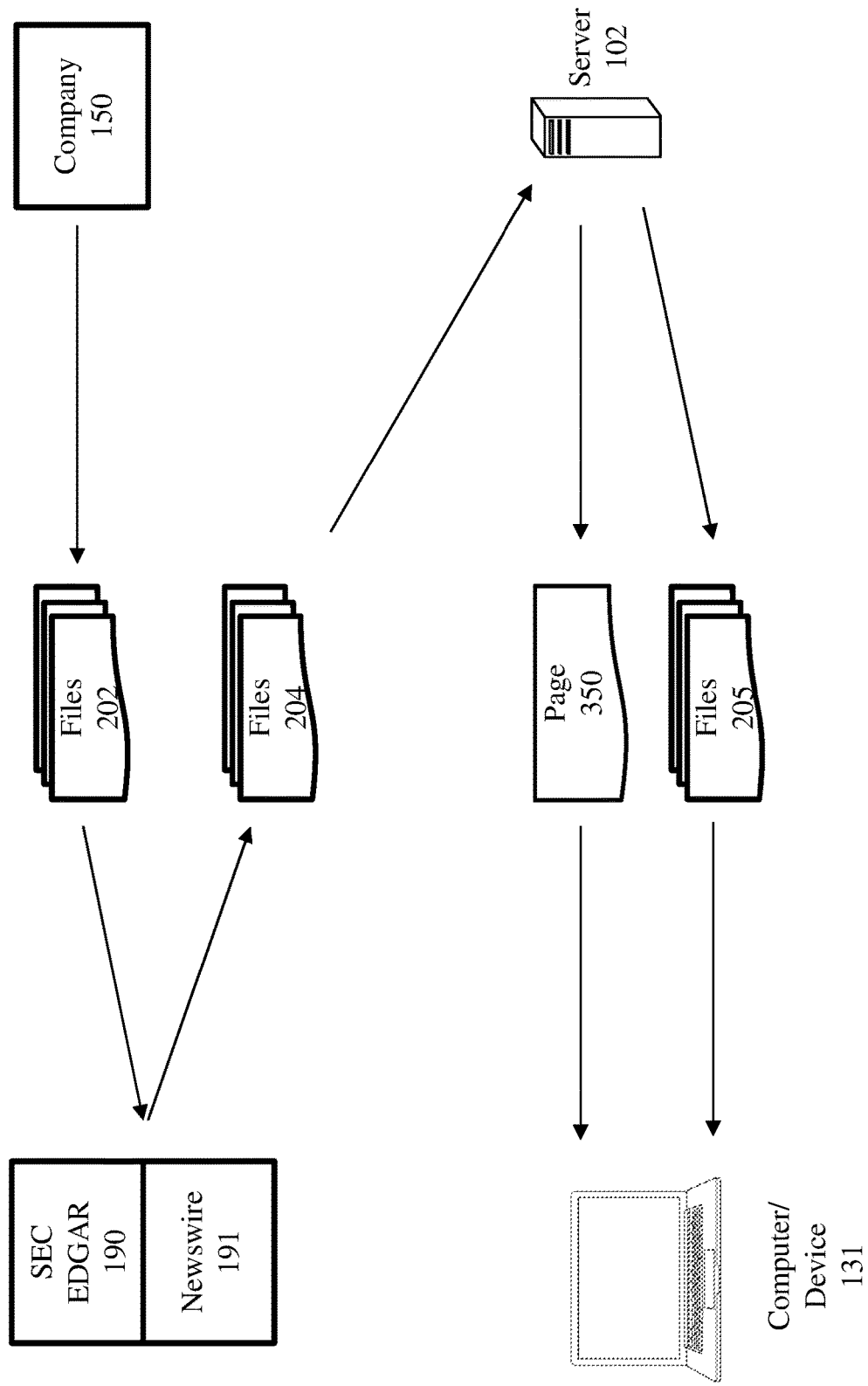
FIG. 2 is a block diagram showing the data flow of the process for providing accessible files over a communications network, according to one embodiment.
Figure 3A:
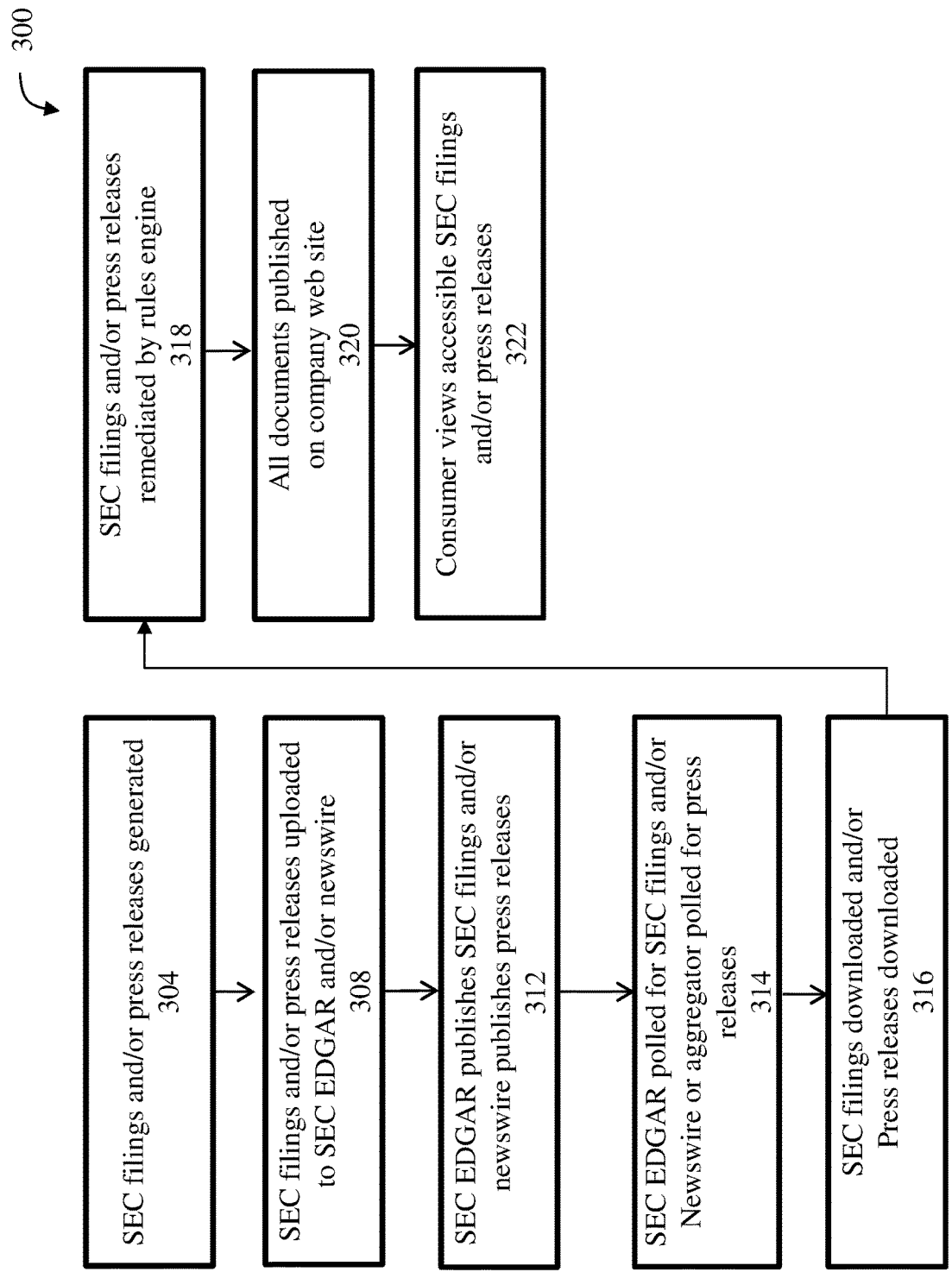
FIG. 3A is a flow chart depicting the general control flow of a process for facilitating the provision of accessible files over a communications network, according to one embodiment.

The process of facilitating the provision of accessible financial, regulatory, and/or communication files and/or code over a communications network will now be described with reference to FIGS. 2-3C below. FIGS. 2-3C depict the data flow and control flow of the process for facilitating the provision of accessible financial, regulatory, and/or communication files and/or code over a communications network 106, according to one embodiment.

In step 304, company 150 generates its SEC filings and/or press releases 202. In one embodiment, said SEC filings and/or press releases 202 comprise a plurality of documents or files. In step 308, server 102 and/or the company uploads or transmits its SEC filings and/or press releases 202 to SEC EDGAR 190 and/or newswire 191. Upon receipt of the files 202 uploaded in step 308, SEC EDGAR 190 and/or newswire 191 may then convert said files into SEC filings and/or press releases 204 that are not accessible.

Subsequently, at a specified time, step 312, SEC EDGAR 190 and/or newswire 191 makes the SEC filing/press release documents public and publishes the SEC filing/press release documents on its site. In step 312, SEC filings and/or press releases 204 are published. For brevity, going forward, the inaccessible documents or files actually published by SEC EDGAR 190 and/or newswire 191 shall be referred to as files 204 or inaccessible files 204.

Then, in step 314, the server 102 or company 150 continuously polls SEC EDGAR 190 and/or newswire 191 to determine whether it has published said files 204. In one embodiment, said polling process comprises periodically transmitting a request for data regarding the company associated with the files 204 and reading the response received. Specifically, the polling process comprises periodically transmitting a request requesting whether the files 204 for the specific company (150) have been published, and reading the response received to determine if said response states that the files 204 for the specific company (150) have been published. In one example, the periodic request (and response) is an HTTP request (and response) or an API request or call to an Application Programming Interface (and response) used by the publishing entity to distribute data about items it publishes. Said request can be made using a CIK number to specifically identify the company 150. A Central Index Key or CIK number is a number given to an individual, company, or foreign government by the United States Securities and Exchange Commission. The number is used to identify its filings in several online databases, including SEC EDGAR. The numbers are up to ten digits in length. In another embodiment, said polling process comprises using a web feed, a JSON feed or an RSS feed that allows users to access updates about publications in a standardized, computer-readable format. Also, in step 314, server 102 or company 150 detects, using its polling process, that SEC EDGAR 190 and/or newswire 191 has published said files 204. Specifically, said detecting process comprises reading the response received to determine if said response states that the files 204 for the specific company (150) have been published.

In step 316, server 102 or company 150 copies or downloads the files 204 from SEC EDGAR 190 and/or newswire 191. Step 316 may comprise downloading, receiving and/or obtaining the files 204 via a feed, as described above. Next, in step 318, server 102 or company 150 processes the files 204 and remediates the same, thereby generating accessible files 205 that were generated based on the inaccessible files 204. This process is described below in greater detail below. That is, embedded in step 318 is the execution of steps for detecting inaccessible code/content in one or more of its files 204, and for creating accessible files 205 corresponding to said inaccessible files, as described more fully below. For brevity, going forward, the accessible documents or files generated in step 318 shall be referred to as files 205 or accessible files 205.

In step 320, server 102 or company 150 publishes the accessible files 205 on the company 150 site. The files 205 may be published by providing a link on a company website that references the location (via a URL) of the files 205. In another embodiment, the files 205 may be published by uploading the full files on the company website such that they are directly downloadable from said company website. The publishing entity may be server 102, company 150, or another entity acting on behalf of company 150, such as a website hosting entity or a third-party content management system. In one embodiment, the process of publishing any information on the web site of company 150 encompasses the acts of logging on to a website hosting server (which may be operated by a third-party hosting entity) using credentials provided by the company and uploading relevant information (such as web pages, code and other software) to said web site hosting server.

In step 320, server 102 or company 150 generates a web page 350 (see FIG. 3C) that provides a series of links or graphic icons for viewing the files 205, according to the data structure described below. In said page 350, each link or icon is configured for viewing a particular accessible file 205. In one embodiment, a link is a URL that is clickable and readable in the viewing area of the file when said file is viewed using a document viewer, such as a word processor or a portable document format viewer. In one embodiment, step 320 operates as follows. Server 102 or company 150 iterates through the files 205, and for each particular file, server 102 or company 150 writes a link to said particular file 205 in web page 350 (such as links 352, 358, 362, 364). In step 322, consumer 111 utilizes his computing device 131 to access web page 350, including files 205.

Note that in one embodiment, the publication process of step 320 happens almost instantaneously upon SEC EDGAR 190 and/or newswire 191 publishing the files 204 in step 312, thereby making step 320 occur in real time. Real-time describes operations in computing or related processes that guarantee occurrences within a specified time, usually a relatively short time. In this case, the real-time process of step 320 happens so quickly (in relation to step 312), that in time scales detectable by humans, step 320 effectively occurs at the same time as step 312. This is because step 320 happens so quickly (in relation to step 312), that a person would perceive step 320 as occurring at the same time as step 312. This is advantageous because regulations require that inaccessible files 204 (published in step 312) are published at the same time as the accessible files 205 (published in step 320) so as not to give the non-disabled investor an advantage over the disabled investor or investor using assistive technology. Additionally, it is important to note that the inaccessible files 204 and corresponding accessible files 205 are published at the same time in step 320. Again, this is advantageous due to regulations that require simultaneous disclosure. In one embodiment, a tolerable limit for the time frame between the publication of documents in step 312 and the publication of documents in step 320 is from about 6 to about 20 milliseconds.

Figure 3B:
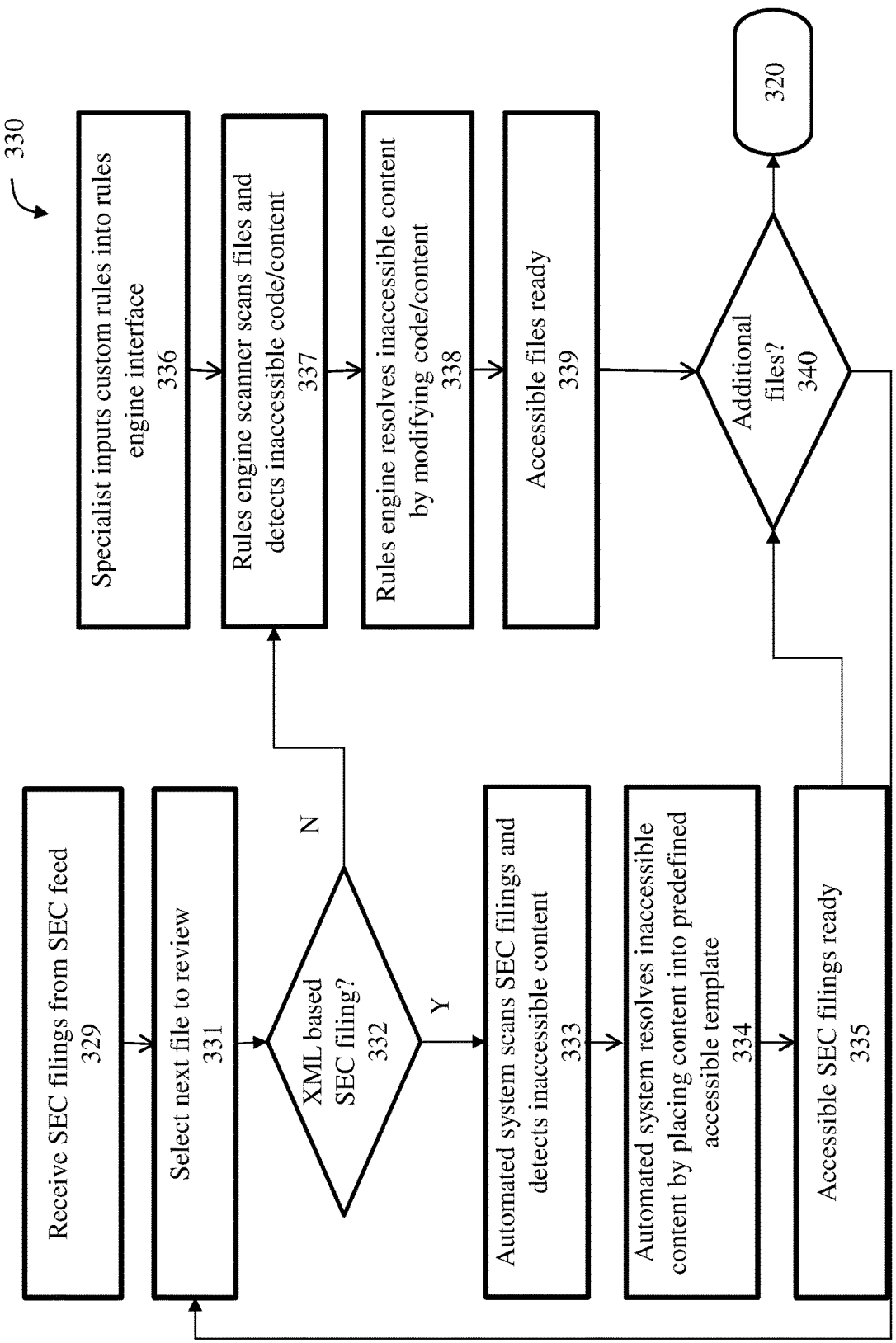
FIG. 3B is a flow chart depicting the general control flow of the remediation portion of the process for facilitating the provision of accessible files over a communications network, according to one embodiment.
Figure 3C:
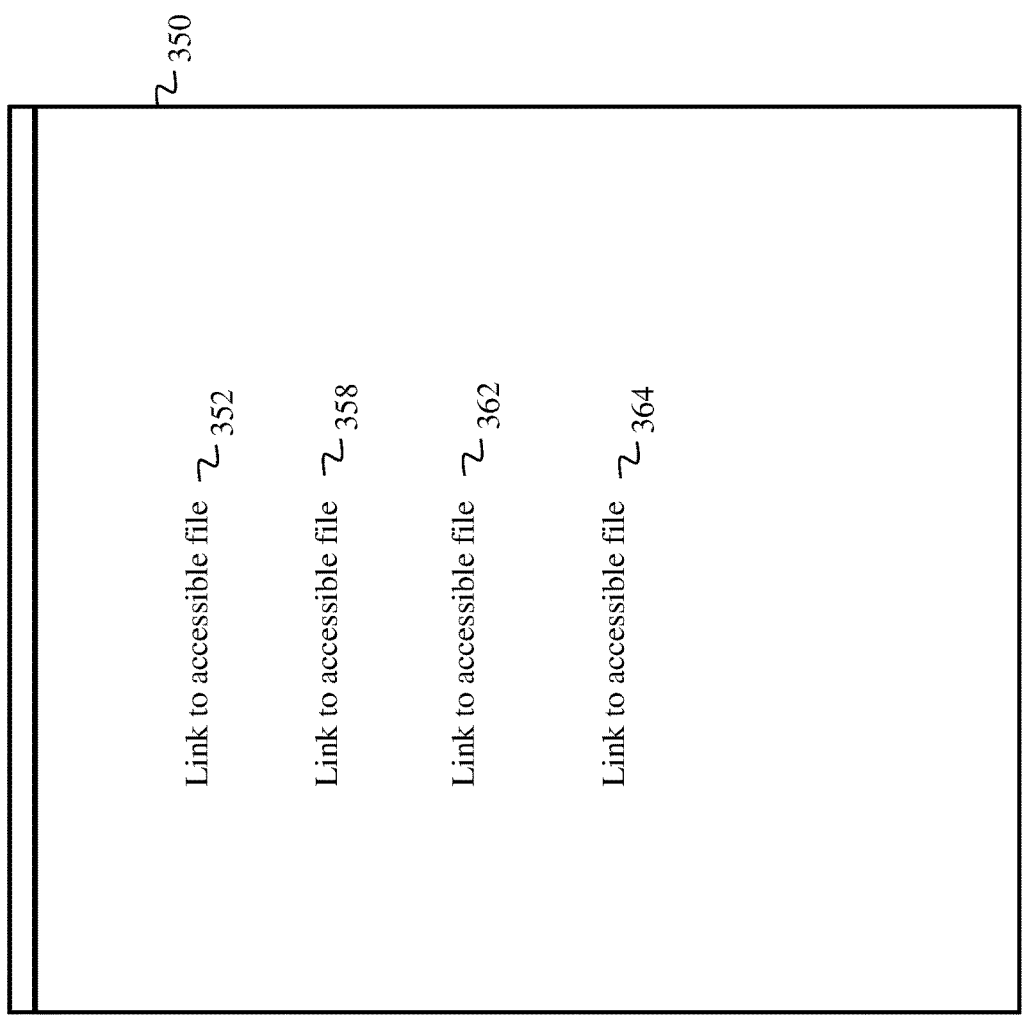
FIG. 3C is a block diagram showing a web page generated during the process for facilitating the provision of accessible files over a communications network, according to one embodiment.

FIG. 3B is a flow chart 330 depicting more detail on the remediation portion of the process for facilitating the provision of accessible files over a communications network, according to one embodiment. The steps of flow chart 330 are performed by server 102 and/or company 150.

The process of flowchart 330 beings with step 329 wherein the SEC filings 204 are received from the SEC feed. Then, the process proceeds with iterating through the files 204, by selecting the first (or next) file to review in step 331. In step 332, the server 102 and/or company 150 determines whether the first (or next file) is an XML-based file. If so, then control flows to step 333. Otherwise, control flows to step 337. An XML based file is an Extensible Markup Language (XML) file, presented in a markup language and file format for storing, transmitting, and reconstructing arbitrary data. XML defines a set of rules for encoding documents in a format that is both human-readable and machine-readable. Although the design of XML focuses on documents, the language is widely used for the representation of arbitrary data structures such as those used in web services. XML has come into common use for the interchange of data over the Internet.

Next, in step 333, server 102 or company 150 processes or scans the files 204 to identify inaccessible files, portions thereof, code or content within them. For example, server 102 or company 150 may identify, within a file 204, code or content (such as images, pictures, clip art, charts, tables, shapes, infographics, embedded objects, inked entries, signatures, video, or audio files, etc.) that is not accessible to persons using assistive technology. In this example, server 102 or company 150 stores in a data structure (such as an array) the position of said code and/or content, as well as a unique identifier for the file 204, such as a file name. The position may be stored as a numerical value that represents the location of said code and/or content within the file 204 and the file name may be stored as a text field. In one embodiment, the position data and the unique identifier data are stored in an array element within an array.

In one embodiment, a file may be deemed as containing code or content not accessible to persons using assistive technology because it lacks alternative text or alt text. Alt text is the written copy that appears in place of an image on a webpage if the image fails to load on a user's screen. Alt text helps screen-reading and assistive technology tools describe images to people using assistive technology. The server 102 or company 150 may also scan the file 204 for image scans of code, written content or content including text. In this example, server 102 or company 150 stores in a data structure (such as an array) the position of said code and/or content, as well as a unique identifier for the file 204, such as a file name. The position may be stored as a numerical value that represents the location of said code and/or content within the file 204 and the file name may be stored as a text field. In one embodiment, the position data and the unique identifier data are stored in an array element within an array.

In step 334, the files 204 or portions of files 204 that were detected as being inaccessible in step 333 above (as memorialized in the data structure), are remediated using a predefined accessible template that is populated using the data from the file 204. A predefined accessible template refers to a file is intended as a starting point from which to create other files. The predefined accessible template used above is an accessible HTML file template that, when populated, is accessible. Accessible data is garnered from the inaccessible files 204 or portions of files 204 that were detected as being inaccessible, and said data is used to populate the predefined accessible template, which then becomes an accessible file 205 ready for publication in step 335. The data structure that was populated with data above (i.e., with data regarding position of inaccessible code and/or content within a file, as well as a unique identifier for the file) is utilized in step 334 to iterate through the files 204, navigate to said inaccessible code/content or inaccessible file (per the data structure), and then remediate said inaccessible code/content.

In one embodiment, server 102 or company 150 detected in step 333 that a file 204 does not have a language (such as English or Spanish) specified, and/or that a title for the file is not specified. This causes a problem because a screen-reader and assistive technology requires that a file specifies both a language, as well as a title for a file in order for the screen reader and assistive technology to operate properly. A screen reader and assistive technology is a technology that helps people who use assistive technology to access and interact with digital content, like websites or documents. The main users of screen readers and assistive technology are people who are blind, have very limited vision, or other disabilities. If a screen reader or assistive technology cannot work properly, the file is not accessible to people with sight disorders or other disabilities. In this example, server 102 or company 150 stores in a data structure (such as an array) a unique identifier for the file 204, such as a file name. The file name may be stored as a text field. In one embodiment, the unique identifier data are stored in an array element within an array.

In one embodiment, in step 334, for any file where the server 102 or company 150 detected that the file does not have a language (such as English or Spanish) specified, and/or that a title for the file is not specified, the server 102 or company 150 creates an accessible file 205 that corresponds to the inaccessible file 204, wherein the accessible file 205 has had English added as the language and an appropriate title it added to the file. In this step, server 102 or company 150 scans the file identified as inaccessible, identifies text in the file that corresponds to a title, and the server creates a corresponding accessible document with said title, thereby creating an accessible file ready to be published in step 335.

To recap, in step 334, server 102 or company 150 creates accessible files 205 that correspond to the inaccessible file, portions of files, or code/content within files that were identified above. For each image, picture, clip art, chart, table, shape, embedded object, inked entry, signature, video, or audio file that was identified as not accessible in the step above, the file is remediated by the server by adding alt text, closed captions, transcripts and correcting tagging, thereby creating a corresponding accessible file 205. Specifically, for all inaccessible code/content identified in the data structure, said inaccessible code/content is remediated, thereby creating a corresponding accessible file 205. An accessible file may include document properties that cater to the disabled or those using assistive technology, alternative text corresponding to visual content, styles that cater to the disabled or those using assistive technology, easily readable column headers and row headers in charts and tables, proper spacing between lines or paragraphs, closed captions for audio files, and accessibility disclaimers throughout the document. That is, an accessible file is a file that is able to be read, used and/or understood by a disabled person or a person using assistive technology. An accessible file 205 that corresponds to the inaccessible file 204 may comprise alt text that has been added to the file.

Prior to step 337, in step 336, a specialist enters rules into the rules engine interface on server 102 or company 150. Said user interface allows the specialist to enter rules, such as if-then rules into the rules engine, which is a program that executes rules against data that is input (in this case, the inaccessible files 204). The rules describe how actions are applied and how an inaccessible file (or a portion thereof) may be changed. A rule may include: what constitutes in accessible content, how content must be changed to be accessible, how data must be modified, etc. A rule may be expressed as an if-then statement that defines a condition precedent and a command, a statement, or other action that is executed if the condition is precedent. The condition may be one or more attributes or facts (such as the presence of an image that is not legible, the presence of data that is not accessible, etc.) that is evaluated against another set of attributes or acts (such as the data in an inaccessible file).

Next, in step 337, the rules engine scanner on server 102 or company 150 processes or scans the files 204 to identify inaccessible files, portions thereof, or code/content within them. For example, server 102 or company 150 may identify, within a file 204, code or content (such as images, pictures, clip art, charts, tables, shapes, infographics, embedded objects, inked entries, signatures, video, or audio files, etc.) that is not accessible to persons using assistive technology. In this example, server 102 or company 150 stores in a data structure (such as an array) the position of said code and/or content, as well as a unique identifier for the file 204, such as a file name. The position may be stored as a numerical value that represents the location of said code and/or content within the file 204 and the file name may be stored as a text field. In one embodiment, the position data and the unique identifier data are stored in an array element within an array.

In step 338, the rules engine on server 102 and/or company 150 executes the custom rules input by the specialist and for any file 204 where the rules engine scanner detected that the file (or a portion thereof) is not accessible, the server 102 or company 150 creates an accessible file 205 that corresponds to the inaccessible file 204, thereby creating an accessible file ready to be published in step 339. Specifically, in step 338, the rules engine executes the set of if-then statements (input by the specialist) against code and/or data from the set of non-XML-based inaccessible files. The execution of said rules results in the code and/or data of said inaccessible files to be remediated, thereby producing an accessible file.

In step 340, it is determined whether any additional files 204 are left to review in the set of files 204. If so, control flows back to step 331 wherein the next file in the set is selected and then remediated. If not, then control flows to step 320 of flowchart 300 (see FIG. 3A).

Figure 4:
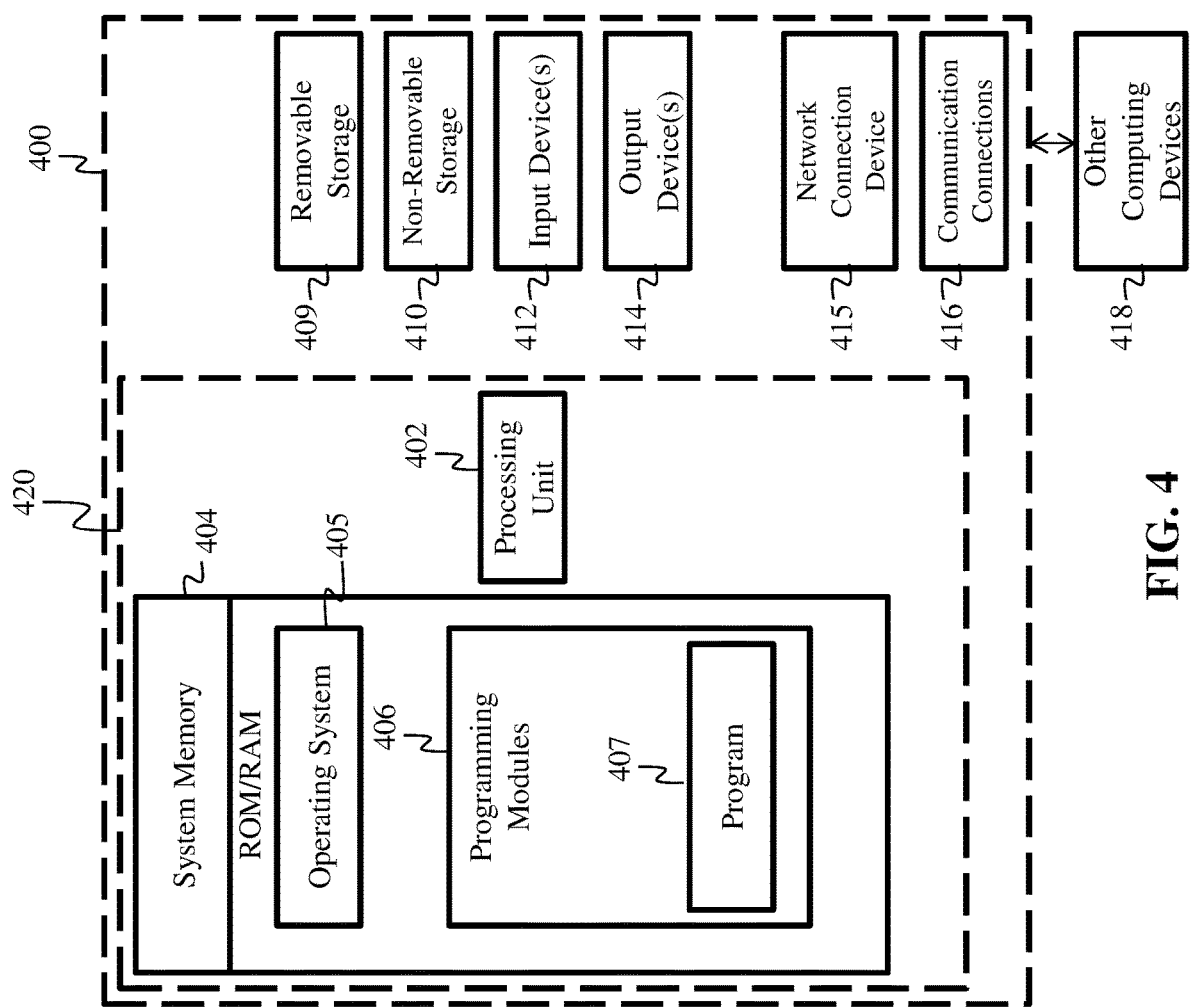
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 102, 131, 150, 190, 191 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and processes 300, 330, as described above. Processes 300, 330 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g.

random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 131, 150, 190, 191, 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer-readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of processes 300, 330 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for facilitating the provision of accessible files over a communications network, the system comprising:
   a web server communicably connected to the communications network, the web server configured for:
   polling an entity over the communications network to determine whether a plurality of files associated with a particular company have been published by the entity;
   detecting that the entity has published said plurality of files;
   downloading said plurality of files from the entity over the communications network;
   identifying a first set of inaccessible XML-based files of the plurality of files, and remediating said first set of inaccessible XML-based files using a predefined accessible template, thereby generating and storing a first plurality of accessible files based on the first set of inaccessible XML-based files, wherein an inaccessible file comprises content that is not accessible to persons with disabilities that use assistive technologies and wherein all content in an accessible file is accessible to persons with disabilities that use assistive technologies;
   identifying a second set of non-XML-based inaccessible files of the plurality of files, remediating said second set of non-XML-based inaccessible files using a rules engine, thereby generating and storing a second plurality of accessible files based on the second set of non-XML-based inaccessible files; and
   generating and publishing a web page that is publicly available over the communications network, wherein the web page includes a separate link to each particular file of the first and second plurality of accessible files, wherein said web page is located on a web site of the particular company; and
   wherein the aforementioned steps performed by the web server are performed in real time.

2. The system of claim 1, wherein said entity is a regulatory agency, a newswire, or an information aggregator.

3. The system of claim 2, wherein a file may be a financial, regulatory or communications file.

4. The system of claim 3, wherein the data structure comprises an array.

5. The system of claim 4, wherein a link comprises a hypertext link and/or an icon.

6. The system of claim 5, wherein a link comprises a uniform resource locator.

7. The system of claim 6, wherein the steps of detecting that the entity has published and of generating and publishing a web page are performed in real time.

8. The system of claim 7, wherein the template comprises an accessible HTML file.

9. The system of claim 8, wherein the step of remediating said first set of inaccessible XML-based files using a predefined accessible template comprises populating the template with data from the first set of inaccessible XML-based files.

10. The system of claim 9, wherein the rules engine comprises a set of if-then statements that are executed against code and/or data from the second set of non-XML-based inaccessible files.

11. A system for facilitating the provision of accessible files over a communications network, the system comprising:
    a web server communicably connected to the communications network, the web server configured for:
    polling an entity over the communications network to determine whether a plurality of files associated with a particular company have been published by the entity;
    detecting that the entity has published said plurality of files;
    downloading said plurality of files from the entity over the communications network;
    identifying a first set of XML-based files, of the plurality of files, having inaccessible code or content, storing in a data structure a reference to a location of said inaccessible code or content, and remediating said first set of XML-based files using the data structure and a predefined accessible template, thereby generating and storing a first plurality of accessible files based on the first set of XML-based files, wherein an inaccessible file comprises content that is not accessible to persons with disabilities that use assistive technologies and wherein all content in an accessible file is accessible to persons with disabilities that use assistive technologies;
    identifying a second first set of non-XML-based files, of the plurality of files, having inaccessible code or content, storing in said data structure a reference to a location of said inaccessible code or content, and remediating said second first set of non-XML-based files using the data structure and a rules engine that executes if-then rules, thereby generating and storing a second plurality of accessible files based on the second first set of non-XML-based files; and
    generating and publishing a web page that is publicly available over the communications network, wherein the web page includes a separate link to each particular file of the first and second plurality of accessible files, wherein said web page is located on a web site of the particular company; and
    wherein the steps performed by the web server are performed in real time.

12. The system of claim 11, wherein said entity is a regulatory agency, a newswire, or an information aggregator.

13. The system of claim 12, wherein a file may be a financial, regulatory or communications file.

14. The system of claim 13, wherein the data structure comprises an array.

15. The system of claim 14, wherein a link comprises a hypertext link and/or an icon.

16. The system of claim 15, wherein a link comprises a uniform resource locator.

17. The system of claim 16, wherein the steps of detecting that the entity has published and of generating and publishing a web page are performed in real time.

18. The system of claim 17, wherein the template comprises an accessible HTML file.

19. The system of claim 18, wherein the step of remediating said first set of XML-based files comprises populating the template with data from the first set of XML-based files.

20. The system of claim 19, wherein the rules engine comprises a set of if-then statements that are executed against code and/or data from the second set of non-XML-based files.

* * * * *